Jan. 13, 1953 J. R. FREDERICK 2,625,401

SOUND REPRODUCING STYLUS

Filed June 23, 1948

Jean Robert Frederick

INVENTOR

BY Corey & Jacobs

ATTORNEYS

Patented Jan. 13, 1953 2,625,401

UNITED STATES PATENT OFFICE 2,625,401

SOUND REPRODUCING STYLUS

Jean Robert Frederick, Conneaut, Ohio

Application June 23, 1948, Serial No. 34,705

3 Claims. (Cl. 274—38)

This invention relates to an improvement in phonographic sound reproducing devices and deals particularly with the stylus of such devices.

In the reproduction of sound from a laterally modulated record groove, the stylus, which translates the pattern of the sound producing impressions into motion and transmits this motion to an electric generating or modulating pickup device, should be so constructed or composed that sufficient compliance is afforded vertically to absorb the shocks of operation and the vertical movements resulting from the undesirable "pinch effect"; further, such a stylus should afford compliance laterally to reduce the amplitude of lateral excursion of the groove-following stylus tip to proportions operable within the pickup device; further, the vertical and lateral compliance characteristics should be so arranged that the compliance of the system along the line of record groove travel will prevent "skating" of the stylus tip, that is, not allow the stylus tip to be pulled along with the moving record a distance, spring back to its normal position and repeat the action periodically with a resultant wave-form distortion; further, the vertical and lateral compliance fulcrums of such a stylus should be located as close to the stylus tip as is mechanically practicable to reduce the movements of the larger areas, thus reducing the capacity of the system with respect to directly radiated sound; further, compliances connected, one to the other in mechanical series, should be increasingly compliant as they approach the working tip.

Styli designed for reproduction of sound from a vertically modulated record groove should conform in general, to the foregoing considered at a ninety degree rotation about an axis parallel to the record groove.

Further, any natural resonance frequencies of composite sound reproducing styli or any of their component parts should be outside the audible range of the vibration spectrum. The parts that will naturally vibrate or resonate to a high frequency, usually the metallic parts, should be designed to do so only at frequencies beyond audible perception, arbitrarily, above twenty thousand cycles per second. The parts of the system that act as dampeners, those made of rubber, plastic, etc., should have natural resonance frequencies several octaves below the audible range. These resonance characteristics affect the energy transmission capacity of a stylus in a manner that greatly affects the efficiency and fidelity of the sound reproducing system.

I have found that, by controlling the relative shapes and sizes of the parts and by the proper application of materials of varying physical characteristics in combination to produce results in accord with the foregoing principles, a stylus can be constructed to be used in the pickup systems now in popular use, with a marked improvement in tracking, distortion, sound radiation, volume output, and frequency-response characteristics. The same principles and devices applied in the design of a pickup system to take their full advantage gives highly satisfactory results, especially in the tracking characteristic.

A purpose of this invention is to provide styli which will, when used as replacements in existing sound reproducing systems, improve the working characteristics according to the foregoing.

A further purpose of the invention is to provide styli particularly adaptable to pickup devices specifically devised for their proper cooperation, resulting in improvements according to the foregoing.

The above and other objects and advantages of the invention will become apparent upon consideration of the following detailed specification and the accompanying drawing wherein is disclosed certain embodiments of the invention.

In the drawing, in which parts performing similar functions are identically noted in the several figures.

Figure 1:
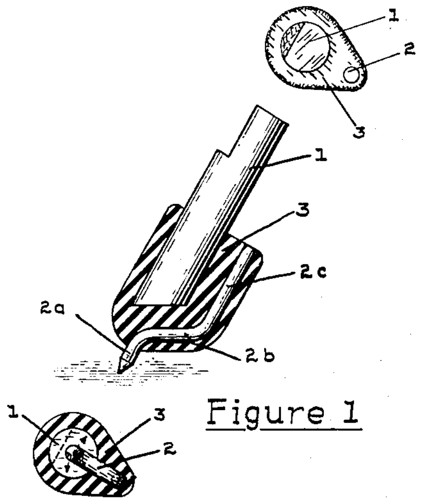
Fig. 1 is a three-view orthographic projection of a removable stylus, an elevational view shown in operating position with respect to a record, part 3 being shown cut away in two views and part 2 being sub-noted functionally and two projection views.

In Fig. 1 is shown, in elevation, a stylus composed of a shank 1 which is made of metal or other relatively rigid material and has a flat or other means of proper orientation and alignment for fastening it in a phonograph pickup; and positioned on the lower end of the shank 1, a stylus crank 2, carrying a phonograph point or tip 2*a*, integrally part of a crank arm 2*b*, and crankshaft 2*c* and also made of metal or other relatively rigid material, is fastened by means of an elastic member or cushion 3, in such a manner that the shaft 2*c* of the stylus crank is held in a position substantially parallel to the shank 1 and the tip end 2*a* is disposed substantially in line with the centerline of the shank 1, the arm 2*b* of the stylus crank 2 being so disposed in the cushion 3 as to prevent direct contact of the stylus crank 2 and the shank 1.

The cushion 3, shown in section in the figures of the drawing, is made of an elastic material such as natural rubber, synthetic rubber or an elastic plastic. As shown in Fig. 1, the cushion 3 is integrally attached by molding or cementing to the shank 1 and extends to one side of such shank, as is illustrated in the projection views, preferably the side toward which the record groove approaches the stylus during operation, to provide a bearing or support for the shank 2*c* of the stylus crank 2; it also depends below the end of the shank 1 to provide support for the arm 2*b* and the tip 2*a* of the stylus crank 2, the record engaging tip 2*a* extending beyond the cushion 3 for free contact with the record.

The lower, or tip end projection view of Fig. 1, illustrates the reaction of the stylus tip 2*a* to lateral impulses, the pointed arc drawn through the tip 2*a* showing how the tip swings in torque motion about the centerline of the shaft 2*c*, imparting energy to the shank 1 through the cushion 3. In operation, the cushion 3 absorbs a part of the resultant of the motions of the tip 2*a* both laterally and vertically, the amplitude of the movements of the shank 1 being substantially less than that of the tip 2*a*. Frequency transmission of the lateral excursions of the tip 2*a* to the shank 1 and ultimately to the pickup are quite accurate within the range of phonograph reproduction when materials of the proper physical characteristics compose the stylus in properly related dimensions. As a result of having reduced amplitude of motion of the larger areas of the stylus, the area of the tip 2*a* being relatively small, directly radiated sound called "needle talk" is reduced.

Figure 2:
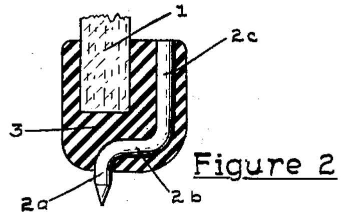
Fig. 2 is an elevational view of a composite stylus adaptable for use as an integral part of a phonograph pickup.

Fig. 2 of the drawing shows an embodiment of the invention with shank 1 suitable as an integral part of a phonograph pickup device, the stylus crank 2 and the cushion 3 being applied as in Fig. 1. In this figure, however, the stylus is shown as operable in a vertical position and the shank 1 is depicted as other than round, as various shapes of the parts and differing operating positions are comprehended within the scope of this invention.

Figure 3:
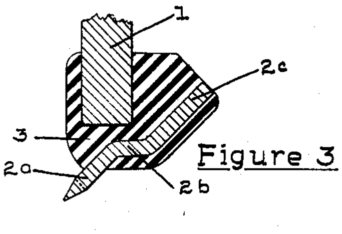
Fig. 3 is a sectional elevational view of a stylus which employs the torque action of the stylus tip on lines distinctly angular to the record.

In Fig. 3 of the drawing a composite stylus is shown in sectioned elevation wherein the shaft 2*c* of the stylus crank 2 is set at an angle to the record and may also be at an angle to the shank 1 as shown. Operating in this position the stylus tip 2*a*, moving laterally and turning somewhat around the shaft 2*c* within the limits of its torque compliance, describes an elliptical arc with respect to a plane perpendicular to the record groove. This action of the tip 2*a* will tend to equalize the undesirable "pinch effect" in which it is necessary for the stylus tip to rise and fall as it passes from one wave form extreme through the normal to the opposite extreme in the record groove.

Figure 4:
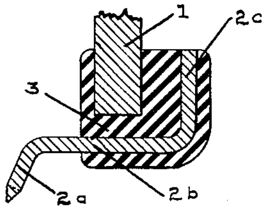
Fig. 4 is a sectional elevational view of a stylus in which the groove-following tip extends beyond the shank.

In Fig. 4 of the drawing is shown a cross-section of a composite stylus composed of a shank 1, a stylus crank 2 and a cushion 3 as has been described, except the arm 2*b* of the stylus crank 2 has been extended beyond the shank 1 which may also be beyond the cushion 3. The stylus may thus be made more compliant; increasing the extension increases the mechanical advantage to favor both lateral, or torque, and vertical compliance. This arrangement of the parts will be of advantage also when, in construction, it is considered desirable to integrally attach the stylus tip 2*a* to the crank arm 2*b* after the cushion 3 and the stylus crank 2 have been assembled. A further advantage of the extended crank arm 2*b* results when the stylus tip 2*a* is, because of size or shape, not adaptable directly opposite the shank 1.

Figure 5:
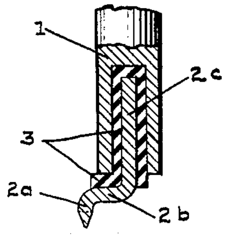
Fig. 5 shows, in vertical section, an alternate means of stylus construction in which the shank is formed to provide a more rigid bearing support for the crank.

Fig. 5 of the drawing shows in cross-section, a composite stylus in which the shank 1 is provided with a hole or slot as a more substantial means of supporting the stylus crank shaft 2*c* within a tubular section of the cushion 3. This construction restricts any tendency of the stylus crank 2 to tilt with respect to the shank 1. It should be understood that the cushion 3 may be made of combinations of materials or of several parts not necessarily integrally constructed in this or any other embodiment of the invention as here, where the cushion 3 may be divided into two parts, one to provide support for the stylus crank shaft 2*c* and another to cushion the arm 2*b* and tip 2*a*.

Figure 6:
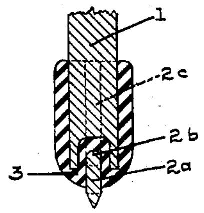
Fig. 6 is a vertical sectional view, the stylus being cut away through the tip and at a right angle to the record groove, showing means of controlling compliance of the tip.

Fig. 6 shows in cross-section through the tip 2*a* of a composite stylus, the section being at right angles to the line of the record groove, the arrangement of extending the relatively rigid material of the shank 1 to provide support to the cushion 3 on the sides of the stylus crank arm 2*b* and tip 2*a*; this provides additional means for controlling torque or lateral compliance of the stylus tip 2*a*.

Figure 7:
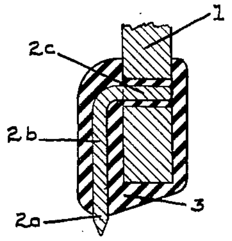
Fig. 7 and Fig. 8 are sectioned elevations of composite styli in which the functional parts are presented in modified arrangement and Fig. 9 is a cut-away elevational view of a composite stylus adapting the basic principles and devices of the invention in a manner more effective in sound reproduction from a vertically modulated record.
Figure 8:
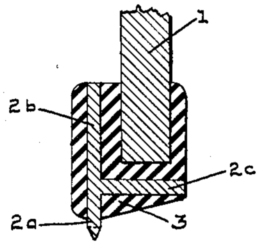

Figs. 7 and 8 show in cross-section two further modifications of constructing composite phonograph styli employing torque compliance controlled by an elastic cushion. In Fig. 7 the shank 1 is provided with an opening to accommodate the cushion 3 and the crank shaft 2*c* of the stylus crank 2; the arm 2*b* depending in a position substantially parallel to the shank 1 supported by the cushion 3. In Fig. 8 the crank shaft 2*c* passes below the shank 1, supported by the cushion 3. The arm 2*b* of the stylus crank 2 is extended upwardly, supported by the cushion 3, resisting and controlling the torque motion of stylus tip 2*a* about the stylus crank 2*c*.

Figure 9:
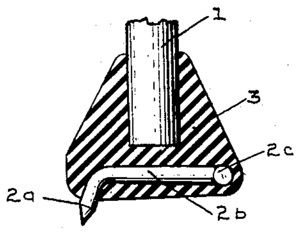

Fig. 9 of the drawing is a cut-away elevational view of a composite stylus applicable to the reproduction of sound from a vertically modulated record groove, in which the shank 1 is attached, or attachable, to a phonograph pickup device, a stylus crank 2 is supported thereon by means of an elastic cushion 3. The stylus crank 2*c* is substantially parallel to the record and extends across and above the record groove so that vertical movements of the stylus tip 2*a* will cause the tip 2a and the arm 2b to swing around the shaft 2c, imparting these motions to the shank 1 and thence to the pickup device.

The means of controlling compliance as illustrated in Figs. 5 and 6 are applicable also to Figs. 7, 8 and 9.

From the foregoing specification, the present invention will be readily understood by those skilled in the art. It should be also understood that the above specifically described embodiments of the invention are illustrative only as various changes may be made therein without departing from the spirit or scope of the invention, which is rather to be defined by the appended claims.

What I claim is:

1. A sound reproducing stylus comprising an elastic cushion, a shank having one end thereof embedded in said cushion and a stylus crank within said elastic cushion close to but spaced from and substantially parallel to said shank and having a tip portion projecting beyond said elastic cushion, said stylus crank including a crank shaft portion alongside said shank end and an angular crank arm portion connecting said crank shaft portion with said tip portion, said tip portion being parallel to the said crank shaft portion and projecting from said cushion at an angle to the horizontal.

2. A sound reproducing stylus comprising an elastic cushion, a shank having one end thereof embedded in said cushion and a stylus crank within said elastic cushion spaced from said shank and having a tip portion projecting outside of said elastic cushion, said stylus crank including a crank shaft portion parallel to the longitudinal axis of said shank and an angular crank arm portion connecting said crank shaft portion with said tip.

3. A sound reproducing stylus comprising an elastic cushion, a rigid cylindrical metal shank having one angularly cut end terminating within said elastic cushion and the other end adapted to be connected to a sound-reproducing device and a stylus crank extending through said cushion in the general direction of said shank and composed of a crank shaft portion parallel to the end of said shank, a tip portion adapted to follow the grooves of a phonographic recording and extending beyond said cushion in axial alignment with said shank and an angularly disposed crank arm portion substantially parallel to the angularly cut end of said shank and connecting said crank shaft portion with said tip portion.

JEAN ROBERT FREDERICK.

REFERENCES CITED

The following references are of record in the file of this patent:

UNITED STATES PATENTS

| Number | Name | Date |
|---|---|---|
| 1,168,412 | Oliver | Jan. 18, 1916 |
| 1,375,750 | Gillet | Apr. 26, 1921 |
| 1,397,835 | Elmer | Nov. 22, 1921 |
| 1,435,095 | Adams | Nov. 7, 1922 |
| 1,444,147 | Zaayer | Feb. 6, 1923 |
| 1,893,796 | Coleman | Jan. 10, 1933 |
| 2,326,424 | Andres | Aug. 10, 1943 |
| 2,328,889 | Capps | Sept. 7, 1943 |
| 2,426,061 | Snepvangers | Aug. 19, 1947 |
| 2,444,218 | Carnahan | June 29, 1948 |
| 2,452,304 | Hutter | Oct. 26, 1948 |
| 2,502,661 | Miller | Apr. 4, 1950 |